United States Patent Office 3,257,375
Patented June 21, 1966

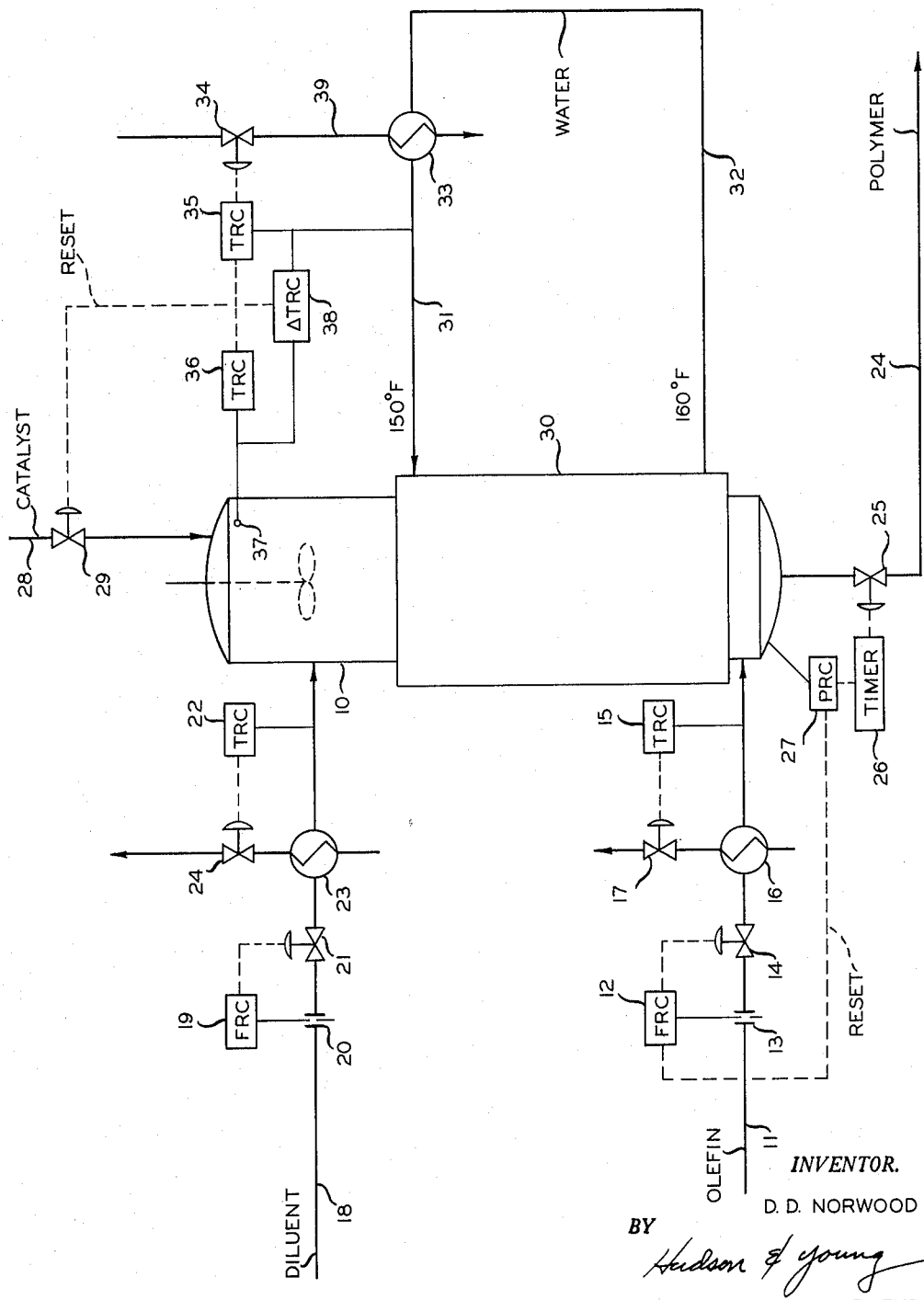

3,257,375
CONTROL OF CATALYST ADDITION TO POLYMERIZATION REACTIONS
Donald D. Norwood, Bartlesville, Okla., assignor to Phillips Petroleum Company, a corporation of Delaware
Filed Sept. 6, 1960, Ser. No. 53,944
3 Claims. (Cl. 260—94.9)

This invention relates to a system and process suitable for controlling chemical reactions. In accordance with one aspect, this invention relates to the control of the reaction rate in a polymerization process. In accordance with another aspect, this invention relates to a method for controlling the rate of addition of catalyst to a polymerization zone. In accordance with a further aspect, this invention relates to a control system for controlling the production rate in the polymerization of olefins in the presence of a solvent and a catalyst, such as chromium oxide.

Various methods are described in the literature for producing normally solid and semi-solid polymers. For example, hydrocarbons, such as ethylene, propylene, 1-butene, and the like can be polymerized, either independently or in various admixtures with one another to produce solid or semi-solid polymers. Recently, considerable attention has been directed toward the production of solid olefin polymers, such as polymers of ethylene and/or propylene. The polymerizations are frequently carried out in the presence of a solid catalyst, utilizing a liquid solvent as the reaction medium. The polymerization reactions are exothermic so that it becomes necessary to provide for the removal of heat liberated by the reaction. The removal of the heat of reaction is frequently accomplished by employing a reactor system provided with an indirect heat exchange means through which a suitable coolant is circulated. One of the problems arising when using such a system relates to the control of the polymerization temperature so that a uniform product having desired properties can be obtained. Also, it is desirable to control production rate for reasons of economy.

Accordingly, an object of this invention is to provide an improved method for controlling catalytic reactions.

Another object of this invention is to provide an improved process and system for controlling exothermic polymerization reactions.

A further object of the invention is to provide a polymerization process whereby a polymer product having uniform properties is produced.

Another object of the present invention is to provide an improved process and system for controlling the temperature in exothermic chemical reactions, especially polymerization reactions.

Other objects, aspects as well as the several advantages of the invention will become apparent to one skilled in the art upon consideration of the accompanying disclosure, the drawing which is a flow diagram illustrating a preferred embodiment of the invention, and the appended claims.

Broadly speaking, the present invention resides in an improvement for controlling the rate at which one of the materials, especially catalyst, is introduced into a reaction zone, particularly a polymerization zone. I have now found that the control of catalyst introduction, in particular, into a reaction zone responsive to the temperature differential between the temperature of the reaction zone contents and the influent temperature of a heat transfer medium provides an improved method for controlling a catalyzed chemical reaction.

In one embodiment, in a process for the polymerization of olefins to normally solid polymers in which olefins are polymerized in a reaction zone in the presence of a diluent and a catalyst and wherein excess heat of reaction is removed by passing a coolant material in heat exchange relationship with the contents of said zone, the present invention resides in the improvement which comprises measuring the influent temperature of either said coolant material or said diluent, or both, passed to said zone and measuring the temperature of the contents of said reaction zone, and then controlling the flow rate of catalyst addition to said zone responsive to the difference in temperature between said contents and said coolant or diluent or both.

In a more specific embodiment of the invention, the catalyst addition rate to a polymerization process such as described above is controlled responsive to the temperature differential between the temperature of the reactor contents and the coolant influent while simultaneously regulating the temperature of said coolant responsive to the temperature of the reaction zone. Further, in accordance with the above specific embodiment, the pressure in the reaction zone is also measured and used to automatically adjust the product withdrawal rate.

The single figure of the drawing is an elevational view of a polymerization reactor embodying the invention. While this figure shows the invention applied to the exothermic polymerization of an olefin feed in a solvent with the aid of a catalyst, it is believed obvious that the present invention also applies generically to all types of exothermic and endothermic catalyzed chemical reactions requiring a more or less constant reaction temperature and production rate.

Although the invention is not limited to liquid-phase reaction, an advantageous application thereof is to liquid-phase operation which is a frequently preferred mode of conducting polymerization. When polymerization is conducted in the liquid phase, it is often preferred to utilize a catalyst in the form of a slurry or suspension in an inert solvent or diluent. The invention is not limited to a particular catalyst or diluent and any catalyst known for the polymerization of olefins to normally solid polymers can be advantageously employed in the process. Also, it should be understood that the invention is not limited to any particular diluent or solvent for use in the process and the choice of diluent will depend primarily upon the particular catalyst employed or the type of polymer to be produced. Also, in some polymerizations the diluent can be the same as the olefin being polymerized.

A particularly advantageous polymerization catalyst and diluent that can be employed in the process of my invention are described in U.S. Patent 2,825,721 of Hogan et al. According to said patent, a chromium oxide catalyst, preferably containing hexavalent chromium, is employed to prepare normally solid polymers of 1-olefins. Diluents or solvents that can be used in that process are hydrocarbon solvents which are inert and liquid under the polymerization conditions, such as paraffins and naphthenes having from 5 to 12 carbon atoms per molecule. Commonly known polymerization catalysts such as the Ziegler-type and high pressure type polymerization catalysts as well as other diluents or solvents can also be used, if desired, in my process.

While the polymerization of ethylene provides a preferred embodiment of the invention it is not intended that the scope of the invention be limited thereby and many modifications are also within the scope of the invention.

Referring now to the drawing, a polymerization reactor 10 is supplied with an olefin feed, for example ethylene, through conduit 11. It is preferred to supply said olefin at substantially a constant rate and temperature. Said rate is preferably controlled by a rate of flow controller 12 actuated by the pressure drop across a diaphragm orifice 13, which controller controls said flow rate by varying the opening of valve 14. Said temperature is preferably controlled by a temperature recording controller 15 which senses the temperature downstream of heat exchanger 16 in conduit 11 and varies the rate of flow of heating or cooling medium through valve 17.

Reactor 10 is also supplied with a suitable solvent or diluent for said olefin feed through conduit 18. The solvent or diluent can also be a solvent for the polymer produced from said olefin. It is preferred to supply said solvent at a substantially constant flow rate and temperature. Said rate is preferably controlled by a rate of flow controller 19 actuated by the pressure drop across a diaphragm orifice 20, which controller controls said flow rate by varying the opening of valve 21. Said temperature is preferably controlled by a temperature recording controller 22 which senses the temperature downstream of heat exchanger 23 in conduit 18 and varies the rate of flow of heating or cooling medium through valve 24. The solvent or diluent stream in conduit 18 can be, if desired, passed through a jacket surrounding the reactor, through coils within the reactor, as well as being introduced directly into the reactor, as shown in the drawing.

The polymerization effluent is removed from tank or reactor 10 through conduit 24 controlled by valve 25. The flow of polymer product in conduit 24 is adjusted in response to the reactor pressure sensed by pressure controller 27. The reactor pressure is sensed by controller 27 and in turn regulates timing mechanism 26, which adjusts the rate of opening and closing of valve 25 in the polymer product withdrawal line.

In polymerization processes such as the particle form polyolefin process in which it is desired to maintain the reactor unsaturated with respect to the olefin, timer 26 can be designed in accordance with FIGURE 1 of Serial No. 815,689 filed May 25, 1959 of Norman F. McLeod, now U.S. Pat. 3,156,537. In accordance with such a timing mechanism, the rate of flow of product through valve 25 is periodically increased so that a gas phase is produced in reactor 10 and the olefin saturation pressure is then measured by controller 27. The olefin saturation pressure measurement is then used to manipulate olefin flow control valve 14. The pressure measurement can be, in an emergency, e.g. when the minimum and maximum pressure limits are exceeded, used to reset controller 12 to stop the olefin flow rate.

The polymerization of olefins, with or without a catalyst, is an exothermic reaction. The excess heat produced during polymerization is removed from reactor 10 at a substantially constant rate by liquid coolant, for example, water, introduced into jacket 30 by conduit 31 and removed from jacket 30 by conduit 32. While the drawing shows the coolant passing through a jacket surrounding the reactor, it should be understood that the coolant can be supplied to a coil within the reactor, or both cooling means can be used, if desired.

As indicated above, the present invention is directed to a method and novel combination of apparatus for controlling the flow of catalyst addition to a polyolefin reactor, such as shown in the drawing, in response to a controller which measures the difference in temperature between the reactor contents and the reactor coolant stream. Also, in accordance with the present invention, the temperature of the coolant passed to the reactor is regulated responsive to the temperature of the reactor contents.

Now referring once again to the drawing, the temperature of the contents of reactor 10 is sensed by temperature sensing means 37 and the temperature measurement thus obtained is transmitted to temperature controller 36 and differential temperature controller 38. The temperature of the coolant in conduit 31 is also measured and the temperature measurement thus obtained is transmitted to temperature controller 35 and differential temperature controller 38. Differential temperature controller 38 receives the temperature signals from the reactor and coolant temperature measuring elements and in turn provides an output signal based on the temperature differential between these two measurements. The output signal from differential temperature controller 38 regulates the flow of catalyst addition into reactor 10 through conduit 28 by adjusting control valve 29. The catalyst added through conduit 28 is preferably in the form of a mud or slurry in the same solvent as is being supplied through conduit 18.

Temperature controller 36 also adjusts the set point of temperature controller 35 responsive to reactor temperature to maintain the reactor temperature substantially constant. Temperature controller 35 adjusts the flow of heat transfer medium in conduit 39 by adjusting control valve 34 in order to maintain the coolant temperature near the set point called for by controller 36.

The control system of the present invention is particularly advantageous for use in polymerization processes since, for a given reactor system, there exists a correlation between polymer production rate and temperature differential between the reactor and inlet coolant. Therefore, once this correlation has been determined, the reactor production rate can be set by merely adjusting the set point on the differential temperature controller 38.

A better understanding of my invention will be obtained upon reference to the following illustrative example which is not intended, however, to be unduly limitative of the invention.

EXAMPLE

In a reactor of the type illustrated in the drawing, ethylene is polymerized by the method of Hogan et al., supra, in the presence of cyclohexane and a chromium oxide catalyst supported on silica-alumina containing approximately 2.5 weight percent chromium in which approximately 2 weight percent is hexavalent chromium. The reaction is carried out at a temperature of 275° F. and a pressure of approximately 400 p.s.i. The operating conditions are as follows:

| Feed (Stream) | Normal | After Decreased Catalyst Activity |
|---|---|---|
| 1. Ethylene (11), lbs./hr | 1,200 | 1,200 |
| 2. Cyclohexane (18), lbs./hr | 9,200 | 9,200 |
| 3. Catalyst (28), lb./hr | 1 | 1.14 |
| 4. Catalyst activity, lbs. polymer per pound catalyst | 800 | 700 |
| 5. Reactor temperature (37) ° F | 275 | 275 |
| 6. Reactor pressure, p.s.i. | 400 | 400 |
| 7. Coolant temperature influent (31) ° F | 150 | 150 |
| 8. Cyclohexane input temperature (22) ° F | 165 | 165 |
| 9. Polyethylene production rate, lbs./hr | 800 | 800 |
| 10. Polymerization effluent (24), lbs./hr | 10,000 | 10,000 |
| 11. Heat of reaction removed by indirect heat transfer (30), B.t.u./hr | 576,000 | 576,000 |
| 12. Heat of reaction lost to incoming cyclohexane (18), B.t.u./hr | 576,000 | 576,000 |

When the catalyst activity decreased from 800 pounds polyethylene per pound catalyst to 700 pounds polyethylene per pound catalyst, as shown above, polyethylene productivity was briefly decreased to a rate of 700 pounds polyethylene per hour, which in turn caused a reduction in the heat of reaction evolved. Since a constant amount of heat is removed by indirect heat transfer (30), the reactor temperature (37) briefly dropped to 274.5° F., thereby causing temperature recorder controlled 35 to be reset from 150° to 155° F., thus returning the reactor temperature to 275° F. The temperature differential between the coolant influent and the reactor contents is measured by differential temperature controller 38 which adjusts the catalyst flow rate through conduit 28 from one pound per hour to 1.14 pounds per hour. This increases the polyethylene production rate to the desired 800 pounds of polyethylene per hour. The additional heat liberated in reactor 10 now causes temperature recorder controller 36 to reset temperature controller 35 to a solvent inlet temperature of 150° F. All conditions are now as before except that the catalyst feed rate has been increased from 1.0 to 1.14 pounds per hour to compensate for the decreased catalyst activity.

While the invention has been described with relation to several specific embodiments, especially the ones shown in the drawing, it is believed the invention is not limited thereto, but is applicable to the control of any exothermic or endothermic catalyzed chemical reaction. An endothermic reaction in which my invention can be used is the oxidation or hydrogenation of vegetable oils, for example, in the presence of a catalyst. Actually, the invention is applicable to the control or manipulation of catalyst input to any chemical reaction zone, exothermic or endothermic, in response to the temperature differential between the reactor contents and the influent temperature of one or more heat transfer mediums passed either in direct or indirect heat exchange relationship with the reactor contents. For example, in the above-described polymerization process, catalyst input can be automatically regulated responsive to the temperature differential between the reactor and inlet diluent.

From the foregoing it is seen that a novel method and combination of apparatus have been provided for controlling the reaction rate in a polymerization process in particular. By maintaining close control over the reaction conditions so that they may remain substantially constant during the practice of the process, it is possible to obtain a polymer product which has desirable uniform properties. It will be apparent to those skilled in the art that variations and modifications of the invention can be made from a study of the foregoing disclosure. Such variations and modifications are believed to be clearly within the spirit and scope of the invention.

I claim:

1. The method for maintaining the reaction temperature and production rate substantially constant for a liquid phase catalyzed reaction wherein catalyst, diluent and reactant feed are introduced into a reaction zone, effluent is removed from the reaction zone, and the heat of reaction in the reaction zone is removed by circulating a coolant material through a closed circuit in indirect heat exchange with the contents of said zone, which method comprises the steps of:

measuring the temperature of the liquid phase of said reaction zone and producing a first signal representative of reaction zone temperature,
    measuring the temperature of said coolant passed to said zone and producing a second signal representative of the coolant influence temperature,
    comparing said first and second signals and producing a control signal representative of the temperature differential between said reaction zone temperature and coolant influent temperature as a measure of production rate,
    automatically regulating the rate of catalyst added to said zone responsive to changes in the magnitude of said control signal so as to maintain said production rate substantially constant, and
    automatically resetting the temperature of coolant influent responsive to changes in the magnitude of said first signal so as to maintain said reaction zone temperature substantially constant.

2. A method for controlling the reaction temperature and production rate at substantially constant values for a process of polymerizing an olefin to a normally solid polymer, wherein polymerization catalyst, olefin monomer and diluent are charged to a polymerization zone, the olefin monomer and diluent being charged at a substantially constant rate and temperature into said zone, coolant material at a predetermined temperature level is continuously circulated through a closed external circuit in indirect heat exchange with the contents of said reaction zone, and an effluent stream containing solid polymer product is removed from said zone, which method comprises the steps of:

measuring the temperature of said coolant material being passed to said zone for heat exchange and producing a first signal representative of the coolant influent temperature,
    measuring the temperature of the contents of said polymerization zone and producing a second signal representative of reaction temperature,
    comparing said first and second signals and producing a control signal as a measure of production rate representative solely of the temperature difference between said coolant influence and reaction zone temperatures,
    automatically regulating the rate of catalyst addition to said zone responsive to changes in the magnitude of said control signal so as to maintain said production rate substantially constant,
    automatically resetting said predetermined temperature level by adjusting the temperature of said coolant influent responsive to changes in said second signal so as to maintain said polymerization zone reaction temperature substantially constant,
    measuring the pressure of said polymerization zone and producing a third output signal representative of the pressure of said zone, and
    automatically controlling the rate of polymer withdrawal from said zone responsive to changes in said third signal by regulating the rate of flow of said effluent stream removed from the polymerization zone.

3. A control system for automatically maintaining constant the temperature and product formation rate of a catalytic olefin polymerization reactor wherein the olefin and diluent are fed into the reactor at constant temperature and wherein the heat of reaction is removed from the reactor by circulating a first coolant material through a closed conduit in indirect first heat exchange means with the contents of said reactor, comprising:

second heat exchange means wherein said first coolant is moved in indirect heat transfer relationship with a second coolant and is cooled thereby;
    first means for detecting temperature of said first coolant at its inlet to said reactor and producing a first control signal representative thereof;
    valve means in conduit containing said second coolant controlled by said first control signal, whereby increase in the temperature of said first coolant will cause increased flow of said second coolant through said second heat exchange means and decrease in the temperature of said first coolant will cause reduced flow of said second coolant through said second heat exchange means thereby maintaining the temperature of said first coolant at a desired level;
    second means for detecting temperature of the reactor contents and producing a second control signal representative thereof;
    means superposing said second control on said first control signal to reset said first control signal to a new desired level whereby an increase of reactor contents temperature causes said second control signal to operate on said first control signal so that a lower desired temperature level of said first coolant is maintained by said first control signal, and a decrease of reactor contents temperature causes said second control signal to operate on said first control signal so that a higher desired temperature level of said first coolant is maintained by said first control signal, thereby maintaining reactor contents temperature constant;
    differential temperature measuring means for comparing said first and said second control signals and producing a third control signal representative of the difference between the temperatures of said first coolant influent and said reactor contents; and valve means in catalyst inlet conduit controlled by said third control signal whereby the flow of catalyst through said valve is increased in response to an increase in the difference between reactor contents temperature and coolant influent temperature and is decreased in response to a decrease in the difference between reactor contents temperature and coolant influent temperature, thus maintaining constant product formation rate.

References Cited by the Examiner

UNITED STATES PATENTS

| | | | |
|---|---|---|---|
| 2,788,264 | 4/1957 | Bremer et al. | 260—94.9 |
| 2,908,734 | 10/1959 | Cottle | 260—683.15 |
| 2,974,017 | 3/1961 | Morgan | 260—94.9 |
| 3,074,919 | 1/1963 | Mellow | 260—94.9 |

JOSEPH L. SCHOFER, *Primary Examiner.*

MORRIS LIEBMAN, JAMES A. SEIDLECK,
*Examiners.*